US010352503B2

(12) United States Patent
Coakley et al.

(10) Patent No.: US 10,352,503 B2
(45) Date of Patent: Jul. 16, 2019

(54) PRESSURISED GAS STORAGE APPARATUS FOR USE AS GAS SOURCE IN A PNEUMATIC DEVICE

(71) Applicant: Carbon Air Limited, Manchester (GB)

(72) Inventors: John FitzGerald Coakley, New Mills (GB); Rodolfo Gustavo Venegas, Salford (GB)

(73) Assignee: Carbon Air Limited, Manchester (GB)

( * ) Notice: Subject to any disclaimer, the term of this patent is extended or adjusted under 35 U.S.C. 154(b) by 68 days.

(21) Appl. No.: 15/310,058

(22) PCT Filed: May 8, 2015

(86) PCT No.: PCT/GB2015/051362
§ 371 (c)(1),
(2) Date: Nov. 9, 2016

(87) PCT Pub. No.: WO2015/173545
PCT Pub. Date: Nov. 19, 2015

(65) Prior Publication Data

US 2017/0152994 A1 Jun. 1, 2017

(30) Foreign Application Priority Data

May 12, 2014 (GB) .................................. 1408399.2

(51) Int. Cl.
*B01D 53/02* (2006.01)
*F17C 11/00* (2006.01)
(Continued)

(52) U.S. Cl.
CPC ................ *F17C 11/00* (2013.01); *F17C 5/06* (2013.01); *F17C 7/00* (2013.01);
(Continued)

(58) Field of Classification Search
CPC .. B24F 19/006; F17C 11/00; F17C 2221/013; F17C 2221/031; F17C 2227/0135;
(Continued)

(56) References Cited

U.S. PATENT DOCUMENTS 4,194,891 A 3/1980 Earls et al.
2004/0265670 A1 12/2004 Muller
(Continued)

FOREIGN PATENT DOCUMENTS

EP 0467486 A1 1/1992
EP 1064996 A1 1/2001
(Continued)

OTHER PUBLICATIONS

International Search Report and Written Opinion for PCT/GB2015/051362 dated Jul. 20, 2015.

*Primary Examiner* — Christopher P Jones
(74) *Attorney, Agent, or Firm* — Olive Law Group, PLLC

(57) ABSTRACT

An apparatus (112, 113) that provides pressurized gas to at least one target location (124), comprising at least one region of adsorptive material that increases an effective storage volume of at least one pressurized gas storage container in selective fluid communication with at least one target location, wherein pressurized gas is stored in the container at a positive pressure of about around 0.5 MPa to 4 MPa. The invention also relates to a method of providing pressurized gas to at least one target location (124) such as a pneumatic system in a vehicle.

14 Claims, 7 Drawing Sheets

(51) Int. Cl.
*F17C 5/06* (2006.01)
*F17C 7/00* (2006.01)

(52) U.S. Cl.
CPC .. *F17C 2221/013* (2013.01); *F17C 2221/031* (2013.01); *F17C 2227/0135* (2013.01); *F17C 2227/04* (2013.01); *F17C 2260/012* (2013.01); *F17C 2270/0563* (2013.01)

(58) Field of Classification Search
CPC ............ F17C 2227/04; F17C 2260/012; F17C 2270/0563; F17C 5/06; F17C 7/00
See application file for complete search history.

(56) References Cited

U.S. PATENT DOCUMENTS

| | | | |
|---|---|---|---|
| 2007/0039967 | A1 | 2/2007 | Oshima et al. |
| 2007/0068389 | A1 | 3/2007 | Yaghi |
| 2009/0188392 | A1 | 7/2009 | Carruthers |
| 2011/0139129 | A1 | 6/2011 | Lang et al. |
| 2013/0219892 | A1 | 8/2013 | Havel |
| 2015/0217620 | A1 | 8/2015 | Berg et al. |

FOREIGN PATENT DOCUMENTS

| | | | |
|---|---|---|---|
| GB | 1552446 | A | 9/1979 |
| WO | 0225190 | A1 | 3/2002 |
| WO | 2005/054742 | A1 | 6/2005 |

PRESSURISED GAS STORAGE APPARATUS FOR USE AS GAS SOURCE IN A PNEUMATIC DEVICE

CROSS REFERENCE TO RELATED APPLICATIONS

This application is a 35 USC 371 application of International PCT Patent Application No. PCT/GB2015/051362, filed on May 8, 2015, which claims priority to Great Britain Patent Application No. 1408399.2, filed on May 12, 2014; the contents of which are hereby incorporated by reference herein in their entireties.

FIELD OF THE INVENTION

The present invention relates to a method and apparatus for storing a pressurised gas. In particular, but not exclusively, the present invention relates to storing pressurised gas, such as compressed air, and providing pressurised gas to one or more pneumatic devices which uses pressurised gas to operate, such as an air spring, pneumatic actuator, or the like.

Conventional pneumatic systems include a compressed air storage cylinder and at least one pneumatic device connected to the cylinder by an air line. A pneumatic device typically includes a variable volume chamber that contains an amount of compressed air supplied from the cylinder. The amount of compressed air in the chamber can be selectively increased or decreased to control the pressure of the air in the chamber and, for example, vary the volume of the chamber accordingly. A variation in volume can be utilised to drive a working element, such as a piston, of a pneumatic device which in turn can be used to apply a force to a location or component part of the system. Alternatively, a change in pressure can be used to selectively control a spring rate or natural frequency of an air spring or damping device.

An example of a pneumatic system is an air brake system for a vehicle. A conventional air brake system includes front and rear air brake devices, one or more compressed air reservoirs for selectively supplying compressed air to each air brake, and a compressor for providing compressed air to each reservoir. Each air brake device includes a variable volume chamber that converts a compressed air force into a mechanical push rod force which selectively operates corresponding brake shoes or pads of the vehicle braking system when required. It is known for conventional air brake systems to also include a dryer unit to remove water vapour from compressed air in the system. Water vapour can lead to condensation forming in the air lines of the system which can cause a variety of operational problems such as freezing, corrosion and/or blocking of the air lines and other equipment, malfunctioning of electronic control instruments, or the like. As an alternative to the air dryer, the system can be equipped with an anti-freeze device and oil separator. However, a dryer unit or anti-freeze device and oil separator are additional components which adds complexity, weight and cost to an air brake system and which require their own space envelope on a vehicle.

The storage cylinders used in such vehicular, or other industrial applications, store compressed air at a pressure of about around 12-14 bar which is slightly higher than the operating pressure of the pneumatic devices to which the stored compressed air is provided. Such storage cylinders provide about around 10-15 liters in storage volume for passenger car applications, and more for heavy trucks, buses and trains, and are thus relatively large in size. However, space and weight is at a real premium for maximising vehicle fuel efficiency and storage space. Thus, it is desirable to significantly reduce the size and weight of compressed air storage cylinders.

SUMMARY OF THE INVENTION

It is an aim of the present invention to at least partly mitigate the above-mentioned problems.

It is an aim of certain embodiments of the present invention to provide a method and apparatus for efficiently storing pressurised gas, such as compressed air, at relatively low pressure in a storage container for supply to a target location, such as an air brake, air spring or the like.

It is an aim of certain embodiments of the present invention to provide a method and apparatus for efficiently storing pressurised gas, such as compressed air, at relatively low pressure in a storage container for supply to a target location, such as an air brake, air spring or the like, whilst minimising the size and weight of the storage container.

It is an aim of certain embodiments of the present invention to provide a method and apparatus for efficiently storing pressurised gas, such as compressed air, at relatively low pressure in a storage container for supply to a target location, such as an air brake, air spring or the like, whilst increasing an effective storage volume of the storage container.

It is an aim of certain embodiments of the present invention to provide a pressurised gas storage container which is relatively lightweight, non-complex or bulky, and structurally strong to withstand stresses at the upper and lower limits of a relatively low operating pressure range of about around 0.5-4 MPa.

According to a first aspect of the present invention there is provided apparatus that provides pressurised gas to at least one target location, comprising:

at least one region of adsorptive material that increases an effective storage volume of at least one pressurised gas storage container in selective fluid communication with at least one target location, wherein pressurised gas is stored in the container at a positive pressure of about around 0.5 MPa to 4 MPa.

Aptly, the pressurised gas is stored in the storage container at a positive pressure of about around 0.5 MPa to 2 MPa.

Aptly, the positive pressure is about around 0.8 MPa to 1.2 MPa.

Aptly, the pressurised gas is compressed air.

Aptly, the pressurised gas is carbon dioxide.

Aptly, the at least one region of adsorptive material comprises at least one unitary element of adsorptive material.

Aptly, the at least one unitary element comprises a self-supported monolith of adsorptive material.

Aptly, the at least one unitary element comprises a load-bearing element of adsorptive material.

Aptly, the at least one region of adsorptive material occupies more than 50% of an inner volume of the container.

Aptly, the at least one region of adsorptive material occupies at least 95% of an inner volume of the container.

Aptly, the at least one region of adsorptive material comprises activated carbon.

Aptly, the activated carbon has an N2 surface area in excess of about around 1500 m2/g.

Aptly, an outer surface of the unitary element supports an inner surface of the container.

Aptly, the storage container comprises a substantially gas impermeable body supported by the at least one region of adsorptive material.

Aptly, the body comprises a flexible polymer.

Aptly, the body comprises a rubber bladder.

Aptly, the at least one region of adsorptive material substantially fills an inner chamber of the storage container.

Aptly, the at least one region of adsorptive material is substantially cylindrical, orthogonal, triangular or annular in cross section.

Aptly, the at least one region of adsorptive material is substantially elongate.

Aptly, the at least one region of adsorptive material comprises at least one channel extending inwardly from an outer surface of the region of adsorptive material.

Aptly, the at least one channel comprises at least one through hole.

Aptly, the at least one channel is oriented substantially in parallel with an axis of the at least one region of adsorptive material.

Aptly, the at least one region of adsorptive material comprises a single unitary element of adsorptive material or a plurality of interconnected unitary elements of adsorptive material.

Aptly, the apparatus further comprises a plurality of connecting members for connecting the plurality of interconnected unitary elements.

Aptly, each connecting member comprises an insert located in a through hole of a corresponding one of the unitary elements, each insert connectable with an adjacent insert.

Aptly, each insert comprises at least one passageway in fluid communication with the adsorptive material to provide or receive pressurised gas to or from the adsorptive material of each corresponding unitary element.

Aptly, each insert further comprises:

an outer portion engaged with an inner surface of the through hole of each corresponding unitary element; and first and further spaced apart end portions that support the at least one passageway within the outer portion of the insert.

Aptly, the passageway of each insert is coaxially arranged relative to the outer portion of the insert.

Aptly, the passageways are selectively connectable in fluid communication to the at least one target location.

Aptly, the apparatus further comprises:

a pressurised gas source in selective fluid communication with the storage container to provide pressurised gas to the at least one region of adsorptive material.

Aptly, the pressurised gas source comprises:

a continuous or rechargeable source of gas; and a positive pressure pump that selectively compresses gas from the source of gas to provide a source of pressurised gas.

Aptly, the positive pressure pump is an electrically driven fluid pump.

Aptly, the positive pressure pump is an engine driven fluid pump.

Aptly, the at least one target location comprises at least one pneumatic device that comprises an inlet and that has at least a first state and a further state selectable responsive to a pressure at the inlet.

Aptly, the pneumatic device comprises one or more of an element of an air brake system, an element of an air suspension system, an element of a cab suspension system, an element of a seat location system, an element of an automatic door closing system, or an element of a tyre inflation system.

Aptly, the pneumatic device comprises at least one air spring having a flexible bellows sealed between a top plate and a bottom plate or piston.

Aptly, the air spring comprises a reversible sleeve air spring or a convoluted air spring.

Aptly, a hollow portion of a vehicle structure or vehicle component provides an inner volume of the storage container.

Aptly, a sill, beam, pillar or panel of a vehicle comprises the hollow portion of a vehicle structure.

Aptly, a steering member, suspension member, axle or wheel spoke of a vehicle comprises the hollow portion of a vehicle component.

Aptly, the at least one region of adsorptive material is a pressurised gas-augmenting filler that substantially fills an inner volume of the storage container. Aptly, the at least one region of adsorptive material is a compressed air-augmenting filler.

Aptly, the storage container at least partially surrounds at least one air line of the apparatus wherein an inner volume of the storage container is in fluid communication with an inner region of the air line. Aptly, a plurality of storage containers surround the at least one air line. Aptly, the at least one storage container comprises at least one hollow sleeve-like storage container that surrounds the at least one air line.

Aptly, the at least one air line extends between the storage container and the at least one target location. Aptly, the air line is adapted to transfer a pressurised gas, such as compressed air or carbon dioxide, from the storage container to the at least one target location.

Aptly, the at least one storage container comprises a plurality of spaced apart storage containers each located at a corresponding node between adjacent air lines of the apparatus.

According to a second aspect of the present invention there is provided a vehicle comprising the apparatus according to the first aspect of the present invention.

Aptly, the vehicle is a car, a truck, a van, a train, an airplane, or a ship.

According to a third aspect of the present invention there is provided a use of at least one region of adsorptive material that increases an effective storage volume of at least one pressurised gas storage container in selective fluid communication with at least one target location, wherein pressurised gas is stored in the container at a positive pressure of about around 0.5 MPa to 4 MPa.

According to a fourth aspect of the present invention there is provided a method of providing pressurised gas to at least one target location, comprising:

locating at least one unitary element of adsorptive material in a storage container for storing pressurised gas and selectively connectable in fluid communication with at least one target location, wherein the at least one unitary element of adsorptive material increases an effective storage volume of the container and the pressurised gas is stored in the container at a positive pressure of about around 0.5 MPa to 4 MPa.

Aptly, the method further comprises:

storing pressurised gas in the container at a positive pressure of about around 0.5 MPa to 2 MPa.

Aptly, the method further comprises:

locating at least one unitary element of adsorptive material in the storage container.

Aptly, the method further comprises:

occupying at least 50% of an inner storage volume of the container with the at least one region of adsorptive material.

Aptly, the pressurised gas is compressed air or carbon dioxide.

Certain embodiments of the present invention may provide a method and apparatus for efficiently storing pressurised gas, such as compressed air, at relatively low pressure in a storage container for supply to a target location, such as an air brake, air spring or the like, whilst minimising the size and weight of the storage container and increasing an effective storage volume of the storage container.

Certain embodiments of the present invention may provide a pressurised gas storage container which is relatively lightweight, non-complex or bulky, and structurally strong to withstand stresses at the upper and lower limits of a relatively low operating pressure range of about around 0.5-4 MPa.

Certain embodiments of the present invention may allow the size, weight and cost associated with a pressurised gas storage container to be greatly reduced and the flexibility in packaging, design and space saving opportunities associated therewith may be significantly increased.

Certain embodiments of the present invention may provide at least one region of activated carbon located in a pressurised gas storage container which may act as a structural support element to support a relatively thin and/or flexible wall of the storage container.

Certain embodiments of the present invention may provide a plurality of pressurised gas storage elements that interconnect to form a modular array of pressurised gas storage elements which may be locatable in a single storage container in a variety of positions and orientations or be configured to provide a plurality of connected storage containers each including an element of adsorptive material.

BRIEF DESCRIPTION OF DRAWINGS

Embodiments of the present invention will now be described hereinafter, by way of example only, with reference to the accompanying drawings in which:

FIGS. 5*a* to 6*b* illustrate the space and packaging savings associated with certain embodiments of the present invention.

DESCRIPTION OF EMBODIMENTS

Figure 1:
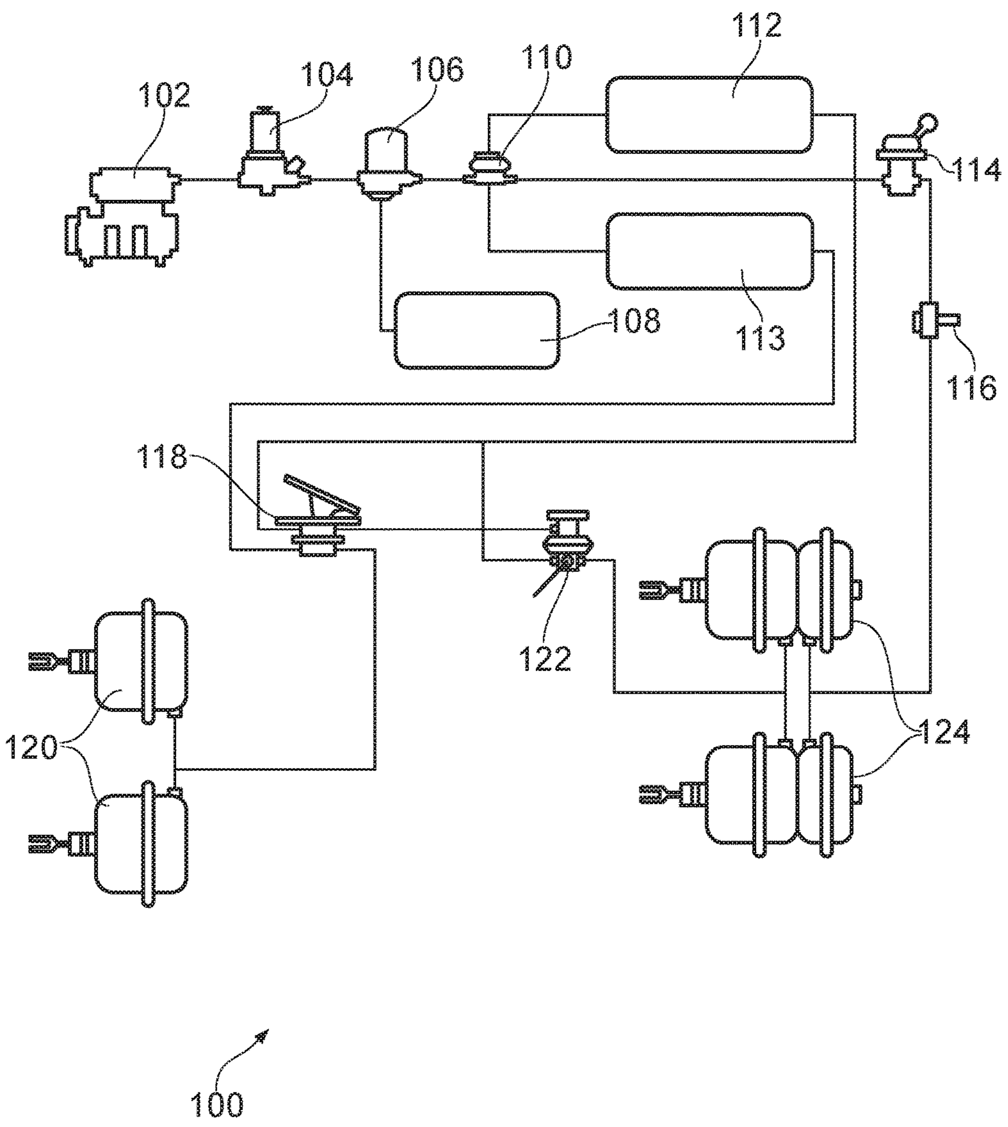
FIG. 1 illustrates an air brake system according to certain embodiments of the present invention.

In the drawings like reference numerals refer to like parts.

FIG. 1 illustrates a compressed air brake system 100 for a vehicle, such as a car, bus, truck, train, or the like. The system 100 includes an air compressor 102, a pressure regulator 104, an air dryer 106, a regeneration reservoir 108, a four-way protection valve 110, a pair of compressed air storage tanks 112, 113, a park brake hand control valve 114, a park brake safety release valve 116, a brake foot valve 118, front air brake chambers 120, a brake relay valve and load sensing valve 122, and rear spring brake chambers 124. The compressor 102 is driven by the engine of the vehicle and compressed air is first routed from the compressor 102 through a cooling coil (not shown) and into the optional air dryer 106 which removes moisture and oil impurities from the compressed air. The compressed air is then stored in the regeneration reservoir 108 (also called a 'wet tank') from which it is then distributed via the four-way protection valve 110 into the front and rear brake circuit air storage tanks 112, 113 for selectively operating the respective front and rear air brakes 120, 124 of the vehicle when required.

Figure 2:
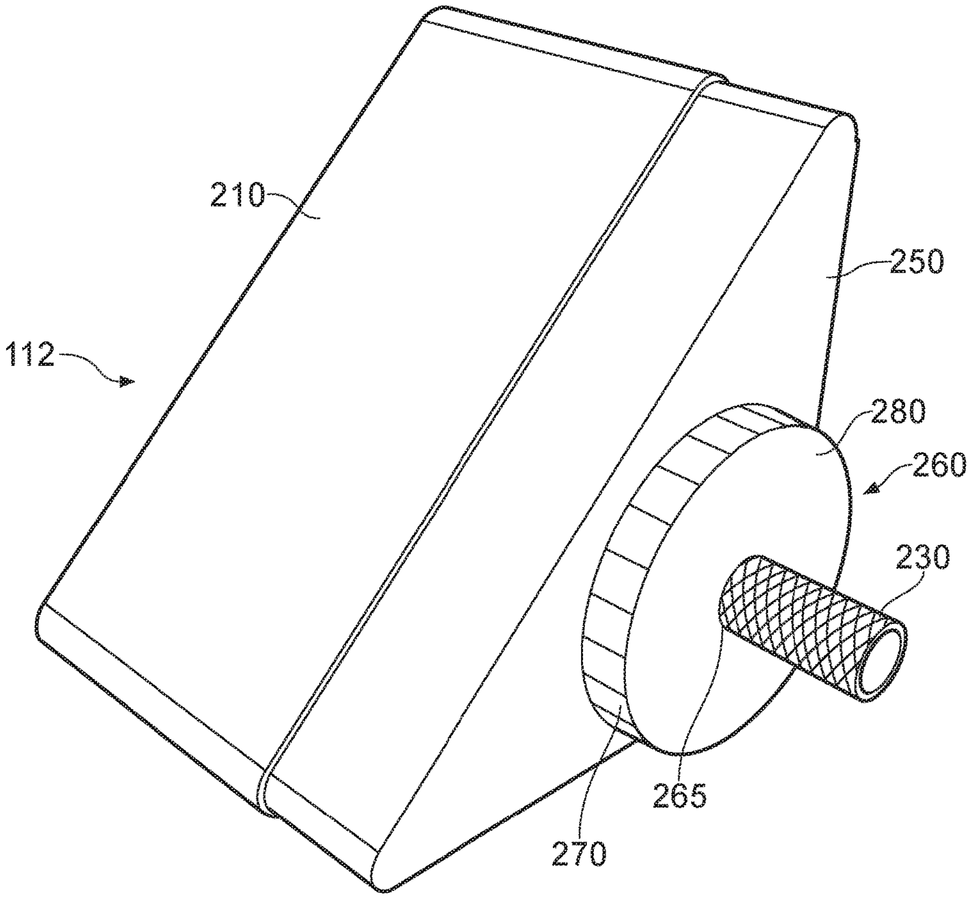
FIG. 2 illustrates one of the compressed air storage container of the air brake system of FIG. 1.

As illustrated in FIG. 2, each compressed air storage tank 112,113 and optionally the regeneration reservoir 108 includes an outer sealed wall portion 210 which defines a chamber having a storage volume for storing an amount of compressed air at a positive pressure of about around 0.5-4 MPa and more particularly but not exclusively 0.5-1.5 MPa. Each tank 112, 113, 108 includes an air inlet and an air outlet which may be separate or combined. The tank 112, 113 also contains a region of activated carbon 250 for increasing an effective storage volume of the tank. An air line 230 passes through the tank 112, 113 to define the air inlet and air outlet. The air line is made of a suitable material, such as plastic, and is substantially impermeable outside the tank and substantially porous inside the tank to allow compressed air to leave the air line and feed air to the activated carbon to be adsorbed by the activated carbon and also to be desorbed form the activated carbon and enter the air line when required by the air braking system 100 for example.

It will be understood that the term 'storage volume' refers to the space or chamber defined by the sealed tank in which the compressed air is stored. In use, the volume is static as opposed to a working volume in a variable volume chamber of an air spring for example.

It will also be understood that, whilst certain embodiments of the present invention described herein refer to a region of activated carbon, other examples of adsorptive material can be used, such as zeolite, silicalite, or the like. The term 'activated carbon' in accordance with certain embodiments of the present invention relates to a family of carbonaceous materials specifically activated to develop strong adsorptive properties whereby even trace quantities of liquids or gases may be adsorbed onto the carbon. Such activated carbons may be produced from a wide range of sources, for example coal, wood, nuts (such as coconut) and bones and may be derived from synthetic sources such as polyacrylonitrile or the like. Various methods of activation exist, such as selective oxidation with steam, carbon dioxide or other gases at elevated temperatures or chemical activation using, for example, zinc chloride or phosphoric acid. An example of an activated carbon is Cellcarb™, or the like, which is commercially available from Chemviron Carbon Limited, 434 London Road, West Thurrock, Grays, Essex, RM20 4DH.

Whilst the region of activated carbon may consist of granules contained by a suitable containing member such as a gas permeable membrane or fine mesh-like structure, the region of activated carbon 250 is aptly a monolith of activated carbon comprising many small, low volume pores that significantly increase the surface area available for adsorption and desorption of compressed air. The presence of the adsorptive material in the chamber of each storage tank increases the effective storage volume of the chamber 150 for receiving and storing compressed air without having to increase the size of the tank itself.

The monolith of activated carbon 250 may include a plurality of channels (not shown) extending inwardly from an outer surface of the unitary element into the core of the unitary element. The channels help ensure compressed air is received into the core of the monolith and to achieve a high-frequency adsorption and desorption of the compressed air. The channels may have a circular cross section and are substantially straight channels but may be any suitable cross section, such as square or triangular, and may follow a curved path for example. The channels may terminate in the core of the unitary element or may be through holes, or a combination of both. The channels may extend in any suitable direction, such as transversely or longitudinally with respect to an axis of the unitary element.

The unitary element of activated carbon 250 may directly engage around the air line 230 or each element of activated carbon may be formed around an insert 260 made from any suitable rigid material, such as plastic, aluminium, or the like. Each insert 260 includes a central inner conduit portion 265 to which the air line 230 is attached and an outer portion 270 on which the unitary element 250 is supported in spaced relationship from the inner conduit portion. The outer portion surrounds the inner portion 265 and may have any suitable cross section such as circular, square or the like. The inner conduit portion 265 is supported centrally inside the outer portion 270 by ends portions 280 which extend between the inner portion and outer portion of the insert. The end portions 280 also add strength to each insert and help to guide compressed air from the inner conduit towards the activated carbon via the outer portion during adsorption, and vice versa for desorption. The inner conduit portion 265 and the outer portion 270 include apertures or perforations to allow air to pass to and from the activated carbon 250 during adsorption and desorption respectively.

The rate at which compressed air is adsorbed and desorbed by the monolith of activated carbon 250 increases with increased pressure. However, the 'volume multiplier' benefit of the activated carbon is at its greatest at relatively 'low' pressures of about around 0.5-4 MPa. This increase in effective storage volume allows each storage tank to be smaller in size than a conventional tank without the activated carbon to achieve the same storage volume for storing compressed air. For example, a conventional compressed air storage tank for a vehicle air brake or air suspension system has an inner volume of about around 10 liters whilst a storage tank according to certain embodiments of the present invention has an inner volume of about around 4 liters whilst providing a relative storage capacity for storing compressed air which is at least the same as that of a conventional storage tank. Furthermore, in view of the relatively low pressure at which the compressed air is stored in the storage tanks, and the fact that hoop stresses in the walls of a relatively small pressure vessel will be significantly lower than in a relatively large pressure vessel, the wall of the tank can be relatively thin and/or use a relatively lightweight material, such as aluminium or hardened plastic, thereby reducing weight and cost.

The element of activated carbon 250 has an effective structural strength to be self-supporting without requiring a separate containing wall or casing to contain the activate carbon which would otherwise be required if the activated carbon was in granular or powder form, for example. This desirably reduces the number of components, packaging requirements and overall weight and cost of the storage tanks. Furthermore, in view of the relatively high vibrational environment in some applications, such as heavy duty vehicles for example, the risk of the unitary element 250 breaking up and/or creating dust or dirt, which could adversely affect other components in an air brake system, such as valves and filter assemblies, is significantly reduced.

The activated carbon 250 also acts as a dryer and filter mechanism to remove any moisture and/or hydrocarbons, such as oil impurities, from the compressed air which could otherwise cause problems in the system, such as corrosion, blockages, or the like. Therefore, the optional air dryer 106 of the air brake system 100 is not required thus further reducing complexity, weight and cost of such a system.

One or more such unitary elements of activated carbon 250 can be located in the chamber. The monolith of activated carbon 250 may be any suitable cross section, such as cylindrical, orthogonal or substantially triangular as illustrated in FIG. 2, and may be substantially elongate. The monolith 250 may be complementarily shaped with an inner space of the storage tank such that the monolith substantially fills the inner volume of the tank.

Furthermore, the unitary element of activated carbon 250 can optionally provide a degree of structure to the storage tank. For example, in view of the low storage pressure of the compressed air in the tank and the structural strength of the unitary element 250, the unitary element 250 may be complementarily shaped with an inner surface of the tank wall 210 which can be relatively thin, plastic or rubber and can be rigid or flexible. This eliminates the need for a relatively heavy outer steel wall otherwise required by conventional storage tanks. The structural monolith of activated carbon supports the tank wall, particularly when the tank wall is substantially flexible and/or when the pressure of the compressed air in the tank is less than atmospheric pressure which would otherwise urge the container wall to collapse inwardly. Where the pressurised gas is carbon dioxide, as opposed to compressed air for example, an inner foil layer or similar may be required to effectively contain the carbon dioxide and prevent the same compromising the integrity of a rubber tank wall, for example, and leaking therefrom. The adsorptiveness of activated carbon to carbon dioxide is greater than that to compressed air. For example, at 10 bar (1 MPa) a container filled with activated carbon will carry about around three times as much air as it would if it had no activated carbon inside. However, in the case of carbon dioxide, the same container filled with activated carbon and at the same pressure will carry about around ten times as much gas as it would if it had no activated carbon inside. At 5 bar (0.5 MPa), the carbon-filled container would carry about around three and a half times as much air, but about around sixteen times as much carbon dioxide. However, at 15 bar (1.5 MPa), the carbon-filled container would carry about around eight times as much carbon dioxide, compared to about around three times as much air.

Figure 3A:
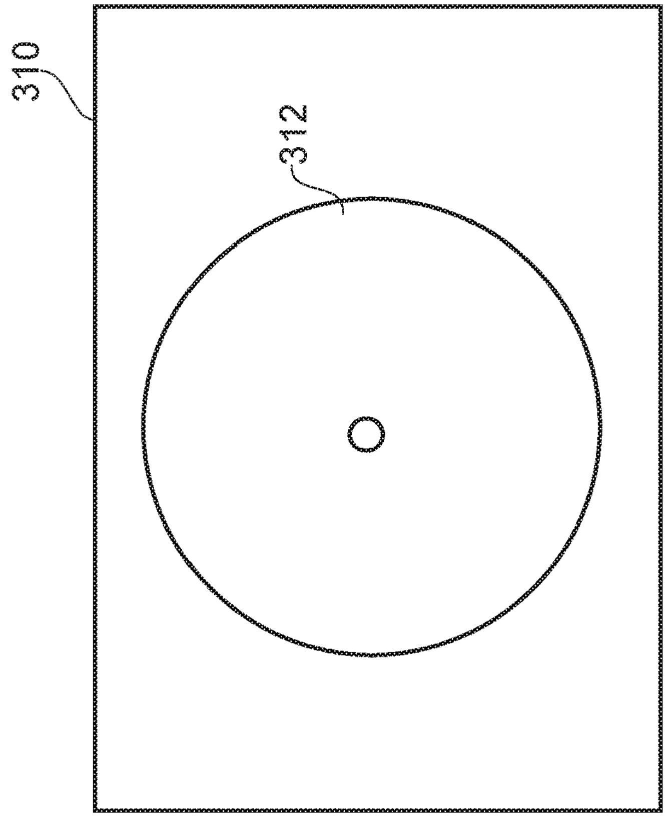
FIGS. 3*a* and 3*b* illustrate the space saving associated with a storage container according to certain embodiments of the present invention.
Figure 3B:
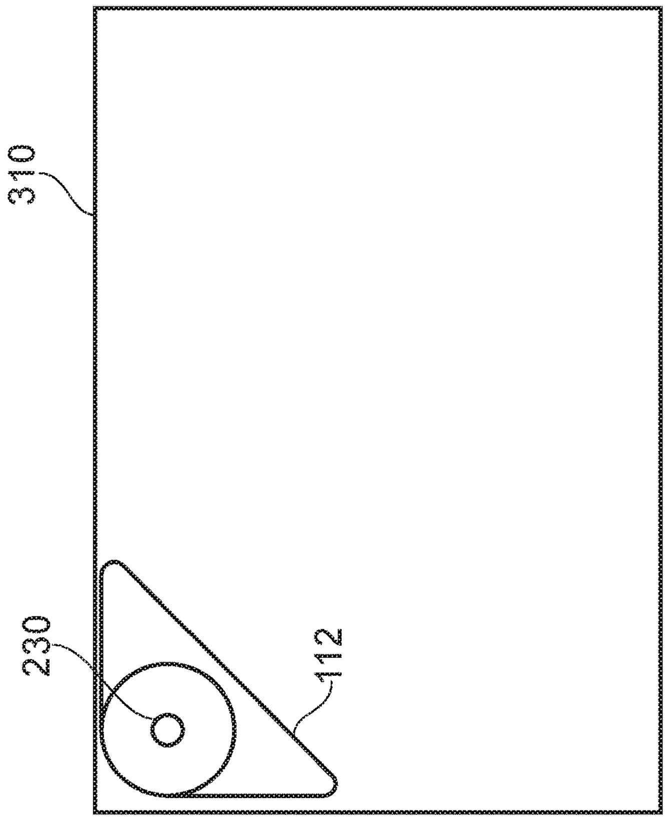

As illustrated in FIGS. 3*a* and 3*b*, the presence of the activated carbon in the storage tank 112 according to certain embodiments of the present invention allows the overall size and required packaging envelope of a conventional compressed air storage tank to be significantly reduced and allows greater flexibility in terms of the shape and profile of the storage tank. As illustrated in FIG. 3*a*, a conventional storage tank 312 having a relatively thick and heavy outer wall, typically made of steel, occupies a large packaging envelope, whereas a storage tank 112 according to certain embodiments of the present invention, as illustrated in FIG. 3*b*, occupies a much smaller packaging space and can be located in many positions and orientations in an available space 310 or in spaces which were not otherwise available or suitable.

Figure 4:
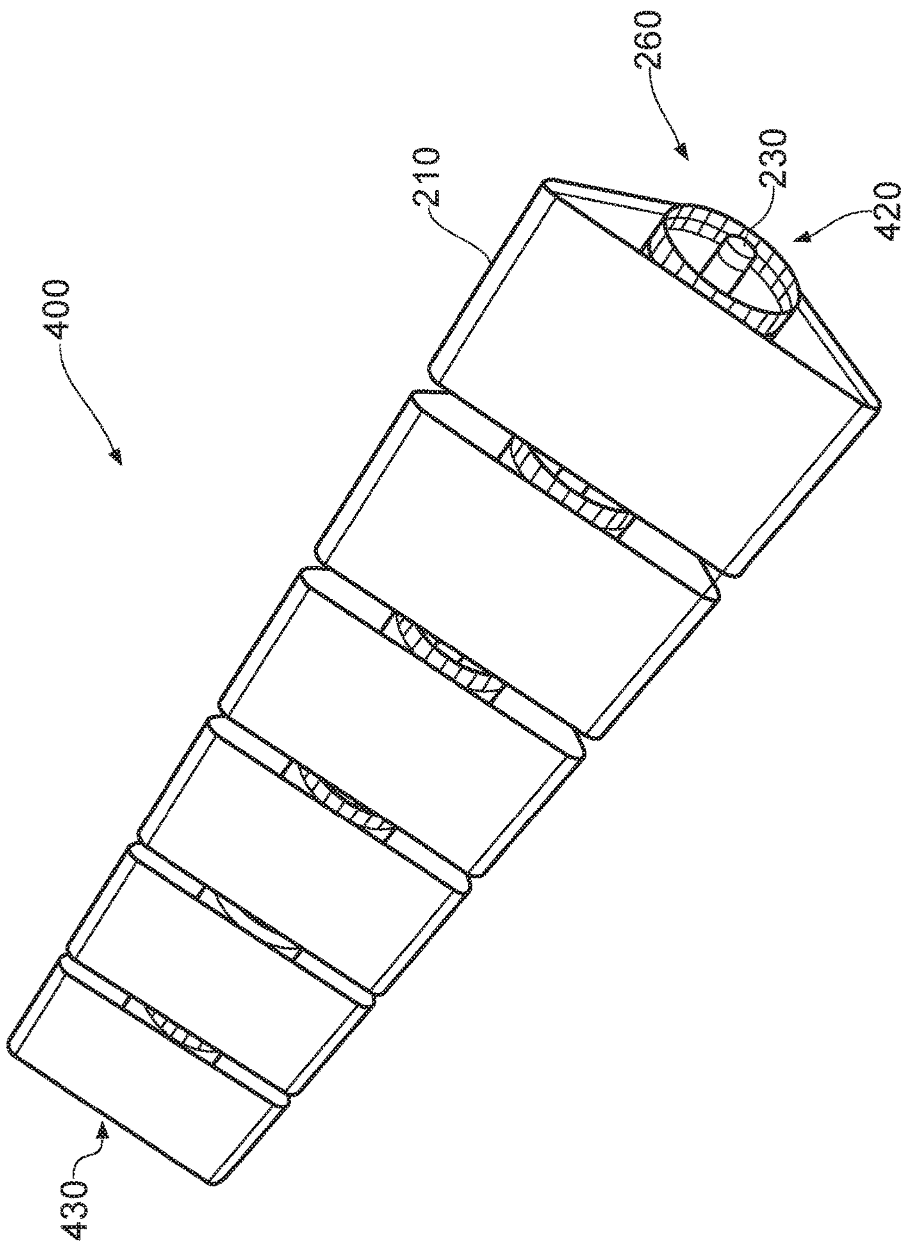
FIG. 4 illustrates a plurality of compressed air storage tanks according to certain embodiments of the present invention connected together and surrounding an air line of the air brake system of FIG. 1 to provide a modular compressed air storage system.
Figures 5A, 5B:
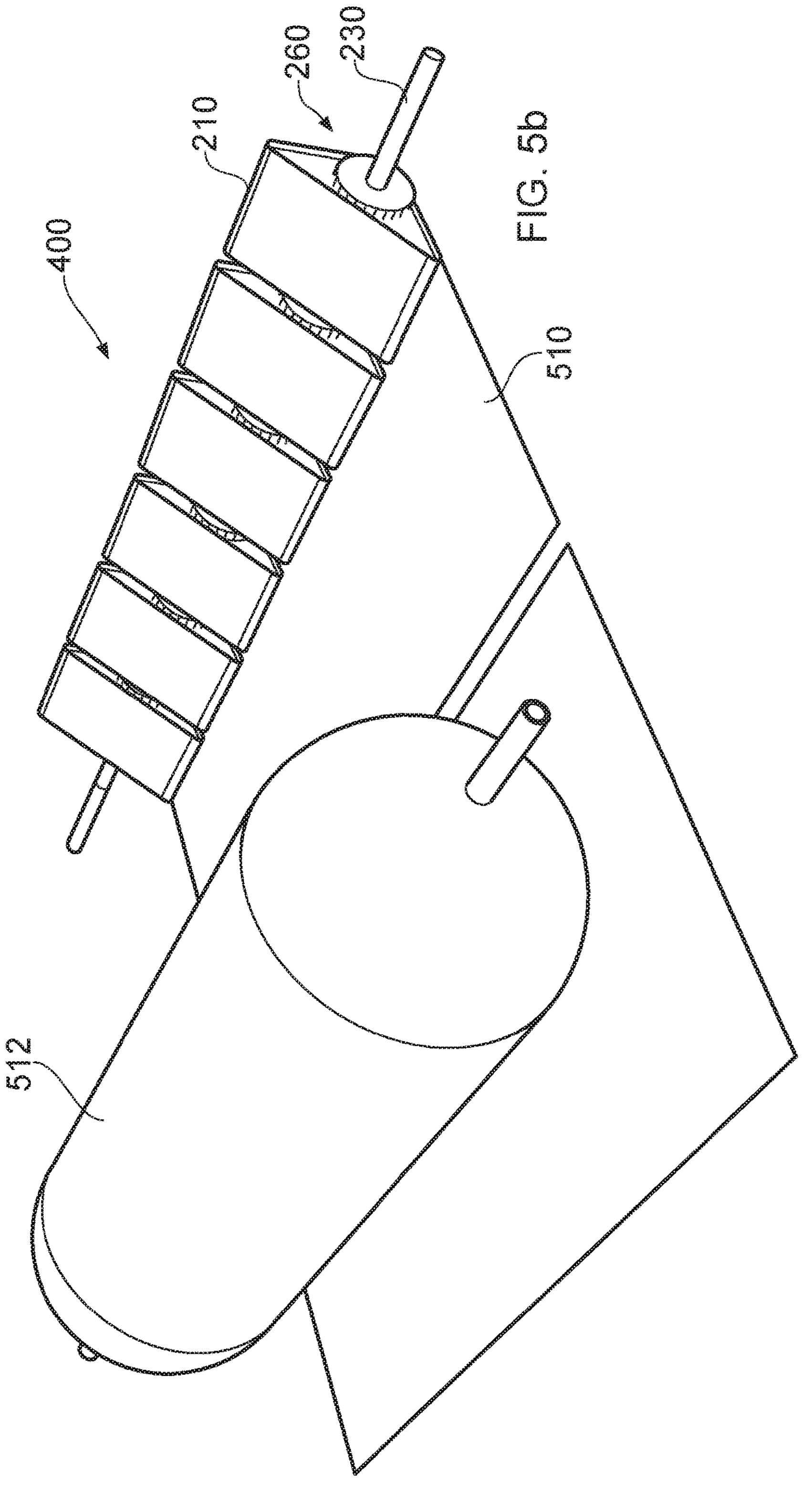
Figure 6B:
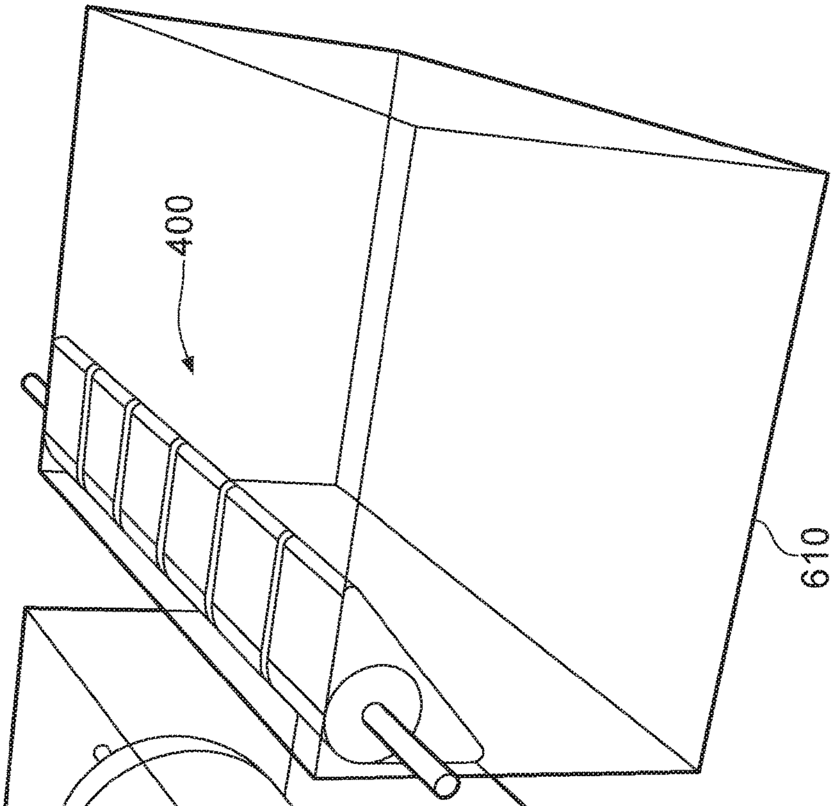
Figure 6A:
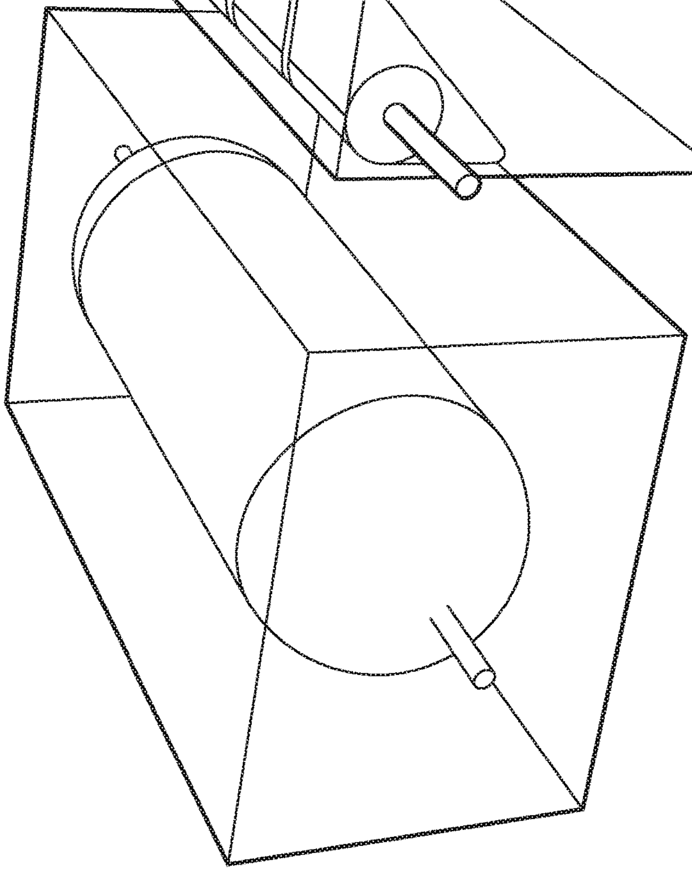

A number of modular elements of activated carbon may interconnect to form a number of interconnected storage elements in a single storage tank. For example, the single storage tank may be any elongate shape and a number of unitary elements of activated carbon, with at least the respective inner conduit portions passing therethrough connected together, may be located along the inside of the tank, wherein each unitary element is complementarily shaped with the inner surface of the tank. Alternatively, as illustrated in FIG. 4, a number of storage tanks 112 each containing a single unitary element of activated carbon may connect together to form a modular storage tank system 400. Each inner conduit portion of each insert 260 of each modular element interconnects with the inner conduit portion of an insert of an adjacent modular element to provide a continuous and substantially elongate passageway from an inlet end 420 to an outlet end 430. Adjacent inner conduit portions may connect together in a male-female manner to provide an interference fit between the adjacent inner conduit portions. Of course, other suitable connection methods or connecting devices may be used such as a screw fit, jubilee clip, snap-fit, or the like.

As illustrated in FIGS. 5*a* to 6*b*, a modular storage tank system 400 according to certain embodiments of the present invention can be located at any number of locations in an available packaging space 510 of a vehicle, for example along one side of an available packaging space 510 or along one corner of an available packaging space 610. This frees up almost entirely all of the available packaging space which can be utilised for other components or desirably the space itself can be significantly reduced, which is not possible with a conventional storage tank 512 which can only be located in a limited number of positions and orientations and takes up almost all of the available packaging space.

Figure 7:
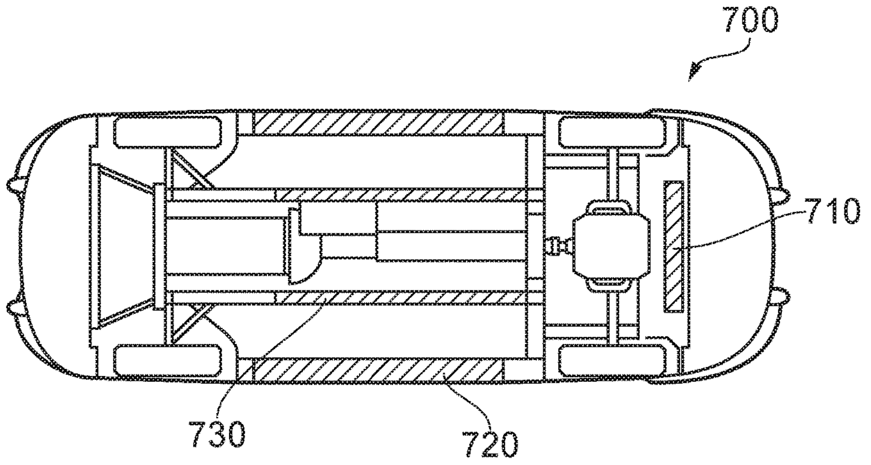
FIGS. 7 and 8 illustrate available cavities on a car and a train carriage respectively in which compressed air may be stored according to certain embodiments of the present invention.
Figure 8:
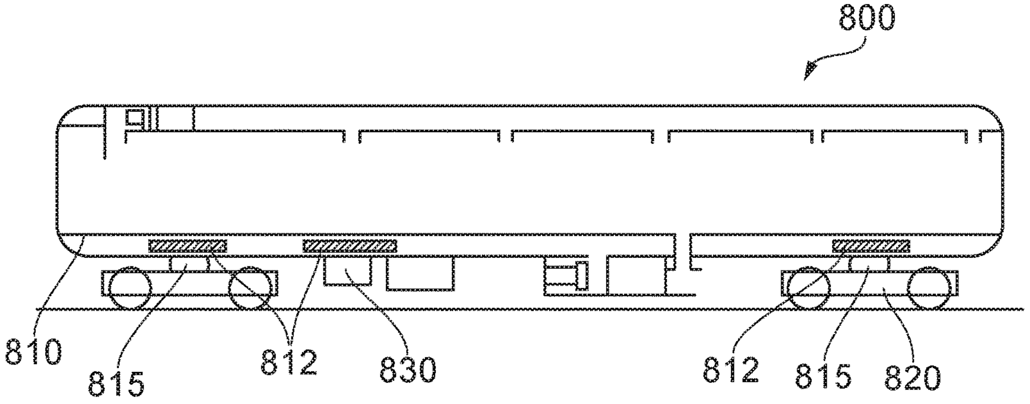

Furthermore, the conduit portions forming the air line extending between each storage tank 210, whilst being substantially impermeable, are substantially flexible to allow the path of the air line to follow a curved path, rather than a substantially straight path as shown in FIGS. 5*a* to 6*b*. In this way, the modular storage system 400 acts like the vertebrae of a spine and offers greater packaging flexibility compared with a conventional storage tank. For example, the modular storage system 400 may be located around the curved wall of a spare tyre well under a rear trunk floor of a vehicle or a number of relatively small interconnected storage tanks may be located in a structural member, such as a beam 710, 730, sill 720, pillar or the like, of a vehicle 700, as illustrated for example in FIG. 7. Of course, other suitable locations and cavities in a vehicle can be envisaged, such as locating one or more storage tanks 812 in accordance with certain embodiments of the present invention under the floating floor 810 of a train carriage 800 or in the carriage bogeys 820, as illustrated in FIG. 8, to store compressed air supplied to each storage tank by a compressor 830 for operating air brake elements, air spring elements 815 and/or other pneumatic devices, such as door closure mechanisms, of the train carriage. As described above, a number of elements of activated carbon according to certain embodiments of the present invention may be connected together at respective inner conduit portions on which the activated carbon is supported and located in a single storage tank. Likewise, a cavity wall of a vehicle structure or component, such as a sill, beam, pillar, panel, or the like, may act as the storage tank and provide the tank wall to define the sealed cavity in which to locate the one or more elements of activated carbon. A number of such cavities around a vehicle may be utilised in this way and connected to an on-board compressor for supplying compressed air to the storage elements in a continuous or trickle-charge manner.

Therefore, certain embodiments of the present invention may provide a storage container that has an increased relative storage capacity for storing a pressurised gas, such as compressed air, at a relatively low pressure of about around 0.5 MPa to 4 MPa. The pressurised gas can be utilised in a pneumatic system on a vehicle, such as a car, truck or train or the like, to operate a pneumatic element of such a system such as an air brake, air spring, door closure device or similar actuator mechanism, or the like. Furthermore, the size, weight and cost associated with a storage container in accordance with certain embodiments of the present invention may be greatly reduced and the flexibility in packaging, design and space saving opportunities may be significantly increased. According to certain embodiments of the present invention, the region of activated carbon located in the storage container may act as a structural support element to support a relatively thin and/or flexible wall of the storage container. Furthermore, a plurality of storage containers according to certain embodiments of the present invention may interconnect to form a modular array of pressurised gas storage elements which may be locatable in a single storage container in a variety of positions and orientations or to provide a plurality of connected storage containers each including an element of adsorptive material.

Throughout the description and claims of this specification, the words “comprise” and “contain” and variations of them mean “including but not limited to” and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of the features and/or steps are mutually exclusive. The invention is not restricted to any details of any foregoing embodiments. The invention extends to any novel one, or novel combination, of the features disclosed in this specification (including any accompanying claims, abstract and drawings), or to any novel one, or any novel combination, of the steps of any method or process so disclosed.

The reader’s attention is directed to all papers and documents which are filed concurrently with or previous to this specification in connection with this application and which are open to public inspection with this specification, and the contents of all such papers and documents are incorporated herein by reference.

The invention claimed is:

1. Apparatus that provides pressurized gas to at least one target location, comprising:

at least one region of adsorptive material that increases an effective storage volume of at least one pressurized gas storage container in selective fluid communication with at least one target location, wherein pressurized gas is stored in the container at a positive pressure of about around 0.5 MPa to 4 MPa, and the at least one target location comprises at least one pneumatic device, wherein the pneumatic device comprises an inlet and that has at least a first state and a further state selectable responsive to a pressure at the inlet, and wherein the pneumatic device comprises one or more of an element of an air brake system, an element of an air suspension system, an element of a cab suspension system, an element of a seat location system, an element of an automatic door closing system, or an element of a tire inflation system.

2. The apparatus as claimed in claim 1, wherein the pressurized gas is stored in the storage container at a positive pressure of about around 0.5 MPa to 2 MPa.

3. The apparatus as claimed in claim 2, wherein the positive pressure is about around 0.8 MPa to 1.2 MPa.

4. The apparatus as claimed in claim 1, wherein the pressurized gas is compressed air or carbon dioxide.

5. The apparatus as claimed in claim 1, wherein the at least one region of adsorptive material comprises at least one unitary element of adsorptive material.

6. The apparatus as claimed in claim 1, wherein the at least one region of adsorptive material comprises activated carbon.

7. The apparatus as claimed in claim 1, wherein the storage container comprises a substantially gas impermeable body supported by the at least one region of adsorptive material.

8. The apparatus as claimed in claim 1, wherein the at least one region of adsorptive material substantially fills an inner chamber of the storage container.

9. The apparatus as claimed in claim 1, wherein the at least one region of adsorptive material comprises at least one channel extending inwardly from an outer surface of the region of adsorptive material.

10. The apparatus as claimed in claim 1, wherein the at least one region of adsorptive material comprises a single unitary element of adsorptive material or a plurality of interconnected unitary elements of adsorptive material.

11. The apparatus as claimed in claim 10, wherein the apparatus further comprises a plurality of connecting members for connecting the plurality of interconnected unitary elements.

12. The apparatus as claimed in claim 1, wherein the apparatus further comprises:

a pressurized gas source in selective fluid communication with the storage container to provide pressurized gas to the at least one region of adsorptive material.

13. The apparatus as claimed in claim 12, wherein the pressurized gas source comprises:

a continuous or rechargeable source of gas; and a positive pressure pump that selectively compresses gas from the source of gas to provide a source of pressurized gas.

14. The apparatus as claimed in claim 1, wherein the storage container at least partially surrounds at least one air line of the apparatus, wherein an inner volume of the storage container is in fluid communication with an inner region of the air line.

* * * * *